(12) United States Patent
Bluhm (10) Patent No.: US 10,525,364 B2
(45) Date of Patent: Jan. 7, 2020

(54) SPEED SIMULATION EFFECT

(71) Applicant: Universal City Studios LLC, Universal City, CA (US)

(72) Inventor: Richard Delos Bluhm, Osaka (JP)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/806,026

(22) Filed: Nov. 7, 2017

(65) Prior Publication Data

US 2019/0134516 A1    May 9, 2019

(51) Int. Cl.
| | |
|---|---|
| *A63G 31/16* | (2006.01) |
| *A63G 31/00* | (2006.01) |
| *A63G 7/00* | (2006.01) |
| *G06T 13/80* | (2011.01) |
| *G06F 3/14* | (2006.01) |

(52) U.S. Cl.
CPC .............. *A63G 31/16* (2013.01); *A63G 7/00* (2013.01); *A63G 31/00* (2013.01); *A63G 31/007* (2013.01); *G06F 3/1423* (2013.01); *G06T 13/80* (2013.01)

(58) Field of Classification Search
CPC .......... A63G 7/00; A63G 25/00; A63G 31/00; A63G 31/06; A63G 31/08; A63G 31/16
USPC .... 472/43, 59–61, 130, 137; 434/29, 51, 55, 434/62
See application file for complete search history.

(56) References Cited

U.S. PATENT DOCUMENTS

| | | | |
|---|---|---|---|
| 2,016,476 A | 10/1935 | Bartlett | |
| 5,403,238 A | 4/1995 | Baxter et al. | |
| 5,623,878 A | 4/1997 | Baxter et al. | |
| 6,095,926 A | * 8/2000 | Hettema | A63G 31/16 104/85 |
| 6,386,984 B1 | 5/2002 | Hara et al. | |
| 7,905,790 B2 | 3/2011 | Schnuckle | |
| 9,278,292 B2 | 3/2016 | Vance et al. | |
| 9,358,473 B2 | 6/2016 | Frolov | |

(Continued)

FOREIGN PATENT DOCUMENTS

| | | |
|---|---|---|
| CA | 2086463 C | 10/1997 |
| FR | 2829035 A1 | 3/2003 |
| GB | 2476078 A | 6/2011 |

OTHER PUBLICATIONS

PCT/US2018/059183 International Search Report and Written Opinion dated Jan. 23, 2019.

*Primary Examiner* — Kien T Nguyen
(74) *Attorney, Agent, or Firm* — Fletcher Yoder, P.C.

(57) ABSTRACT

Provided herein is a ride system. The ride system includes a ride vehicle configured to move along a ride path at a first speed in a forward direction. Furthermore, the ride system includes a display system proximate the ride path, such that the display system displays imagery of an object moving at a second speed and away from the forward direction, and such that the second speed is based on a position of the ride vehicle, the first speed of the ride vehicle, or a combination thereof. The ride system also includes a control system that includes a processor and a memory device communicatively coupled to the processor. The memory devices stores instructions that cause the processor to provide a first control signal to cause the display system to change the second speed of the imagery based on the position of the ride vehicle, the first speed of the ride vehicle, or a combination thereof.

17 Claims, 5 Drawing Sheets

(56) References Cited

U.S. PATENT DOCUMENTS

| | | | |
|---|---|---|---|
| 2008/0188318 A1* | 8/2008 | Piccionelli | A63G 7/00 472/60 |
| 2013/0145953 A1* | 6/2013 | Crawford | A63G 31/16 104/28 |
| 2015/0190726 A1* | 7/2015 | Frolov | A63F 13/837 472/61 |
| 2016/0303484 A1 | 10/2016 | Masutti | |
| 2017/0267099 A1 | 9/2017 | Yerli | |

* cited by examiner

SPEED SIMULATION EFFECT

FIELD OF DISCLOSURE

The present disclosure relates generally to the field of amusement parks. More specifically, embodiments of the present disclosure relate to methods and equipment utilized to provide amusement park experiences.

BACKGROUND

Various amusement park rides have been created to provide passengers with unique motion or visual experiences. In one example, roller coasters and theme rides may be implemented with multi-passenger vehicles that travel along a path. In addition to the excitement created by the speed or change in direction of the vehicles as the passengers move along the path, the vehicles themselves may generate special effects, such as sound or motion effects. In another example, certain rides may be implemented with visually enhancing (e.g., image displays, imagery, or projections) elements to create varying scenery and movement as the passenger vehicles travel along the path. However, regardless of such enhancements to these passenger vehicles, the passenger in the vehicle may not feel immersed in the ride because the enhancements may not fully engage the passengers. For example, the sound effects (or any other enhancement) may not be coordinated with the motion experiences of the passenger traveling in the vehicle. As a result, there are challenges associated with implementing the enhancements while the ride operates. The inability to coordinate various enhancements in a ride vehicle may prevent the overall ride experience from being fully immersive. Accordingly, there is a need for an improved amusement ride vehicle that operates in an environment where enhancements are coordinated (e.g., to simulate certain experiences), while improving the excitement experienced by the passengers.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a ride system is provided. The ride system includes a ride vehicle configured to move along a ride path at a first speed in a forward direction. Furthermore, the ride system includes a display system proximate the ride path, such that the display system displays imagery of an object moving at a second speed and away from the forward direction, and such that the second speed is based on a position of the ride vehicle, the first speed of the ride vehicle, or a combination thereof. The ride system also includes a control system that includes a processor and a memory device communicatively coupled to the processor. The memory devices stores instructions that cause the processor to provide a first control signal to cause the display system to change the second speed of the imagery based on the position of the ride vehicle, the first speed of the ride vehicle, or a combination thereof.

In accordance with another embodiment, a vehicle ride system is provided. The vehicle ride system includes a ride vehicle that moves along a ride path in a ride environment, a display system forming at least a portion of the ride environment, the display system being disposed along the ride path, and a control system. The control system includes a processor and a memory device, such that the memory device is communicatively coupled to the processor. Furthermore, the memory device stores instructions to cause the processor to cause the ride vehicle to move along the ride path, such that the ride path is adjacent to the display system, cause the display system to display imagery of an object moving away from the ride vehicle at a speed based on a vehicle speed, and cause the ride vehicle to stop on the ride path.

In accordance with yet another embodiment, a method includes receiving a ride vehicle into an area comprising one or more display systems, displaying a speed simulation effect on the one or more display systems while the ride vehicle decelerates, opening an egress gate after the ride vehicle decelerates, such that the egress gate includes a portion of the one or more display systems, and causing the ride vehicle to travel through the egress gate in response to the opening of the egress gate.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Provided herein are techniques for providing speed visual effects in a ride environment that mimic the visual sensory cues for speeds and that can be used in conjunction with a moving and/or stopped vehicle. For example, the speed visual effects may be dynamically adjusted during vehicle slowdowns such that, even during vehicle deceleration, the vehicle passengers experience that they are hurtling ahead at high speeds. That is, the speed effects mask the actual vehicle speed during decelerations or low speed sections of a ride such that passengers may experience speed thrills even in areas of a ride that do not support actual high speeds, e.g., that are space-constrained.

While certain attractions may use displayed or projected imagery as part of a simulation-based ride experience, incorporating such imagery into a path-based ride is more challenging. A path-based ride typically accommodates multiple vehicles at different points along the path to permit more passenger throughput. The path may connect multiple show areas along the track, each with its own display systems, projected imagery, and desired effects. Accordingly, in typical path-based rides, the path is open, which permits the passengers to see the section of the path (e.g., the vehicle track) and scenery directly ahead of them. However, this arrangement may counteract speed simulation effects, because any stationary objects that are visible to the passengers serve to undercut the illusion that a slower or stopped vehicle is travelling at high speeds. A low light environment may help maintain the illusion by masking stationary objects, but low light environments are difficult to maintain in an open path ride in which light from the adjacent show areas spills into the high speed simulation area. Further, even in low light environments, forward-facing passengers see the path and scenery ahead of them intermittently, which can undermine the illusion.

Provided herein is a vehicle ride system with speed simulation effects and incorporating aspects of both path-based and simulation-based ride environments to create an illusion that the ride vehicle is travelling at high speed, regardless of whether the ride vehicle is in motion or stationary. In an embodiment, the speed simulation effects may be used in conjunction with a ride that includes one or more display systems displaying imagery (e.g., a dynamic environmental scenery) of receding scenery along a portion of a ride path to create a high speed illusion effect. In an embodiment, the display system may include one or more surfaces modified to display imagery. Further, the displayed imagery of receding scenery use vehicle speed and/or position as an input to the speed simulation effect display controls, permitting the speed simulation effect to visually mimic acceleration in conjunction with vehicle deceleration. That is, the speed at which the displayed imagery of the speed simulation effect appear to scroll past or recede into the background is at least in part based on actual vehicle speed or position, such that the speed simulation effect dynamically adjusts to mask variation in actual vehicle speed that would undercut the illusion. In this manner, the excitement experienced by the passengers may be enhanced due to the effects associated with the movement of the ride vehicle, the imagery projected via the display system, audio effects, real world physical effects (e.g., wind effects), or some combination thereof. Further, passengers may experience enhanced speed effects via the projected imagery in interior or otherwise confined spaces in which it would be mechanically complex to achieve real-world high speeds.

The disclosed speed simulation effects may be used in conjunction with ride systems that provide a low light environment with immersive projection areas and that block passenger views into adjacent sections of the path. As provided herein, one of the structures that forms part of a display system for the imagery may also function as an egress gate that blocks the path of the ride vehicle. By blocking the path, the egress gate prevents passengers from seeing the adjacent show areas and also blocks any additional light from infiltrating the illusion. The egress gate may form a part of the illusion via the projected imagery. For example, in conjunction with or subsequent to the speed simulation effect, the egress gate opens (e.g., slides open) to allow the ride vehicle to continue along the ride path. In an embodiment, the egress gate may, at certain points in the ride experience, project imagery to generate the illusion that the egress gate was never present in the ride path (e.g., by changing displays to mimic the section of track that was blocked and its accompanying scenery). In this manner, the illusion is maintained for the passengers at various points in the ride experience.

While the disclosed embodiments are generally described in the context of amusement park rides, it should be understood that the disclosed arrangements may also be used in other contexts. For example, the imagery may be used for vehicle or flight training, sports training, therapy purposes, and the like. Further, while the disclosed embodiments are depicted in the context of a track-based ride, it should be understood that the ride environment may be a non-track ride.

Figure 1:
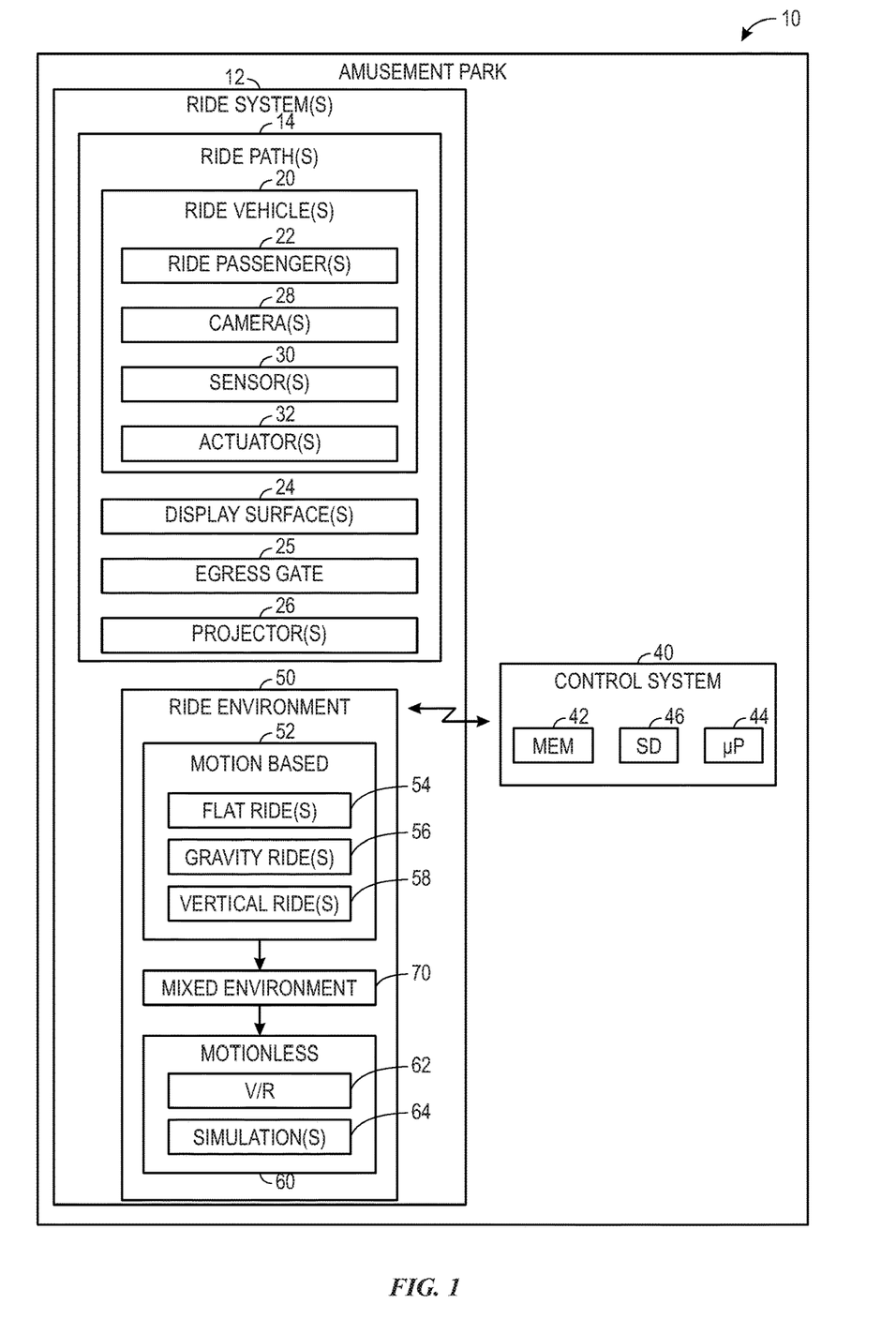
FIG. 1 depicts a block diagram of various components of an amusement park, in accordance an embodiment of the present disclosure.

FIG. 1 is a block diagram of various components of an amusement park 10, in accordance an embodiment of the present disclosure. In an embodiment, the amusement park 10 includes a ride system 12 that includes a ride path 14. The ride path 14 may receive a ride vehicle 20, for example, by engaging with tires or rollers that facilitate movement of the ride vehicle 20 along the ride path 14. In an embodiment, the ride path 14 defines a trajectory for the ride vehicle 20 that may include turns, grade changes, loops, and the like. The ride vehicle 20 may receive one or more passengers 22 and secure the passengers 22 to the ride vehicle 20.

In an embodiment, the ride system 12 includes one or more display systems 24 that enable the display of imagery. The display system 24 may include one or more display systems that enable the display of imagery. In an embodiment, the display system 24 may receive light emitted from a projector 26 (which may be part of the display system 24) to generate moving and/or stationary imagery. In an embodiment, the display system 24 may be implemented as a smooth surface to facilitate the display of light emitted from the projector 26. However, it should be understood that the display system 24 may be configured in any suitable shape or color to facilitate a ride narrative or theme. Furthermore, the display system 24 may be positioned along the ride path 14 such that the imagery generated by the projector 26 is displayed along the ride path 14. Indeed, the display systems 24 may include the walls enclosing and/or defining the ride path 14. In an embodiment, the imagery generated by the projector 26 may depict patches of light displayed on an enclosure (e.g., side walls) defining the ride path 14. In particular, the patches of light may be spaced apart with respect to one another at any pre-determined distance and positioned at any respective height relative to the ground. Indeed, in an embodiment, the patches of light may each translate (e.g., scroll) horizontally (e.g., at a pre-determined height) past the passengers 22. Furthermore, in an embodiment, the patches of light move past the passenger 22 at a target speed and fade into darkness. In an embodiment, the imagery may be scrolled static elevations and/or video images of scrolled static elevations. The elevations may be reconstructions or images of tunnel side walls. The images may be based on actual tunnel walls (e.g., images of adjacent portions of the attraction) or may be digitally created. The images may depict any suitable features, such as lights, wall features (bricks).

In an embodiment, the enclosure formed by the walls defining the ride path 14 may facilitate provision of a dark or dimly lit environment that further facilitates the display of the imagery generated by the projector 26. For example, the ride path 14 may be enclosed and/or defined by two side walls along the direction of the ride path 14, such that a first side wall is positioned left of the ride vehicle 20 and a second side wall is positioned right of the ride vehicle 20. Furthermore, a top surface, a front surface, and a floor may further bound the ride path 14. The top surface, the front surface, the floor, and the two side walls (e.g., the first side wall and the second side wall) along the direction of the ride path 14 may fully or partially define or bound the ride path 14. In an embodiment, the display system(s) 24 may include the first side wall, the second side wall, the top surface, the floor on some combination thereof.

In an embodiment, the display system 24 may remain stationary and receive the imagery via the projector 26 or otherwise provide the imagery. Indeed, the projector 26 may project imagery on a display surface of the display system 24. Alternatively or in addition, the display system 24 may move relative to the ride path 14. For example, a display surface or screen (e.g., LCD display) may move. While the display system 24 is moving, it may continue to receive imagery (e.g., via the projector 26), thereby enhancing the ride experience. As provided herein, a portion of the display system 24 may be implemented as an egress gate 25 that is configured to transition between a closed position blocking the ride path 14 and an open position that permits the ride vehicle 22 to advance.

In addition or alternatively, the projector 26 may project moving imagery (e.g., as a video file) on the display system 24. In an embodiment, the projector 26 may create the illusion, via the projected moving imagery, that the ride vehicle 20 is rushing past the imagery, despite the ride vehicle 20 being stationary. For example, while the ride vehicle 20 comes to a stop, the projector 26 may project moving imagery on the display system 24, such that the moving imagery (e.g., displayed while the ride vehicle 20 is stationary relative the ride path 14), from the point of view of the passenger 22, creates a similar effect to that of stationary imagery (e.g., which may correspond to projected stationary imagery while the ride vehicle 20 was traveling along the ride path 14).

In an embodiment, the direction and speed of the moving imagery may be directly related to the speed and/or position of the ride vehicle 20. For example, the ride vehicle 20 may travel at a certain speed (e.g., 15 miles per hour (mph)) relative to the stationary imagery. However, when the ride vehicle 20 begins to slow down, the projector 26 may begin projecting moving imagery (e.g., as a video file) on the display system, such that the moving imagery move relative to the projection surface 24 at a target speed, such that the target speed of the moving imagery relative to the ride vehicle 20 is substantially similar to the certain speed (e.g., 15 mph), despite the ride vehicle 20 slowing or stopping. However, it should be understood that the vehicle speed and/or the imagery speed may be adjusted to achieve desired speed effects, which provide a sense of speed to the passengers 22.

To facilitate the illusion that the ride vehicle 20 has not stopped or slowed down, the imagery may be projected by one or more light-emitting projectors 26. For example, the projector 26 may include projector lamps (e.g., metal halide projector lamps and ultra-high performance (UHP) projector lamps), 2K projectors, 4K projectors, light-emitting diodes (LEDs), RGB (red, green, and blue) lasers, hybrid light sources (e.g., mercury lamps, fluorescent lamps, and LEDs), or some combination thereof. In an embodiment, any suitable types and number of projectors 26 may be positioned along the ride path 14. Accordingly, the projector 26 may generate the imagery along a portion or along the entirety of the ride path 14. While embodiments of the present disclosure have been discussed in the context of projected imagery, it should be understood that the display system 24 as provided herein may alternatively or additionally include integrated display technology (e.g., LCD) that generates the imagery discussed herein. Such embodiments may not include the projector 26. It should be understood that reference to projected imagery is an example and other embodiments may include images displayed via integrated displays.

In an embodiment, the imagery may be projected as a video file by the projector 26. For example, when the ride vehicle 20 reaches a certain position on the ride path 14, the projector 26 may be instructed to play a video file that includes moving images. In an embodiment, ride system 12 may transition from stationary imagery to video file imagery to start the speed simulation effect. While the ride vehicle 20 decelerates, the video file may cause the display of images that increase in speed toward the rear of the vehicle 20 (e.g., sped up playback), such that decreasing the speed of the ride vehicle 20 causes a corresponding increase in speed of the images moving along the display system 24 (e.g., by fast forwarding the speed of the video file) to maintain the illusion that the ride vehicle 20 has not stopped. Accordingly, in an embodiment, the images may along the display system 24 at a speed higher than the speed of the ride vehicle 20 when the ride vehicle 20 starts decelerating. However, it should be understood that the speed of the images moving along the display system 24 may be generated by other suitable methods. For example, the images may correspond to recorded images taken from a vehicle moving at high speed and/or may be computer-modified images (e.g., sped up and adjusted to blur certain features to mimic high speed effects).

The ride system 12 may include features that provide vehicle or environmental data to a control system 40 and that may be used as inputs to determine vehicle speed and/or position. The ride vehicle 20 or a ride environment 50 may include a camera 28 that captures imagery data associated with the ride vehicle 20. For example, the camera 28 may include a visual spectrum camera and/or an infrared camera to track the position of the ride vehicle 20 or retrieve imagery data associated with the ride system 12. Furthermore, in an embodiment, any suitable number of cameras 28 may be positioned along the ride path 14 (e.g., on the ceiling of the ride system 12 or on the walls defining the ride path 14) to track the position of the ride vehicle 20. In addition or alternatively, the camera(s) 28 may capture individual imagery (e.g., at variable frame rates), video data, audio data, or some combination thereof. In an embodiment, the camera(s) 28 may be positioned on the ride vehicle 20 (e.g., in the front of the ride vehicle 20) to capture imagery data associated with the ride vehicle 20. For example, the camera 28 may capture imagery data associated with the brightness of the environment of the ride path to facilitate the adjustment of the imagery displayed on the display system 24. In an embodiment, the ride system 12 may adjust the brightness of the display system 24 and/or the displayed imagery to be below a target light level in the ride environment 50. That is, because the speed simulation effect may be more effective in dimly lit environments, the ride system 12 may dynamically adjust light levels to be below or at the target light level. In an embodiment, the imagery data may be communicated to a control system (e.g., as feedback data used to adjust the light characteristics of the imagery the projector 26). The camera 28 may also provide vehicle speed and/or position inputs to the system 12

In an embodiment, the ride vehicle 20 includes sensors 30 to detect information (e.g., sensor data) associated with the ride system 12. For example, the ride vehicle 20 may include a speed sensor (e.g., tachometer) that determines the speed of the ride vehicle 20 relative the display system 24. The ride vehicle 20 may include a spatial positioning device (e.g., global positioning system (GPS)) to determine the location of the ride vehicle 20. In addition or alternatively, the ride system 12 may include any other suitable sensor(s) 30 (e.g., infrared sensor(s), capacitance sensor(s), ultrasonic sensor(s), magnetic sensor(s), optical sensor(s) etc.) to detect information associated with the characteristics of the light displayed on the display system 24, the speed and position of the ride vehicle 20, and the like. The sensor data may be provided to a control system 40 (e.g., as feedback data) to facilitate and enhance the display of the imagery on the display system 24. In addition, the sensors data may be provided to the control system 40 to enable the control of the ride vehicle 20. The vehicle speed and/or position may also be estimated from time stamp data. That is, the speed illusion effect may be synchronized to ride system 12 control signals for the vehicle 20 at certain time stamps.

In an embodiment, the control system 40 is communicatively coupled (e.g., via wired or wireless features) to the ride vehicle 20. Specifically, the control system 40 may be communicatively coupled to one or more ride vehicle(s) 20 via any suitable wired and/or wireless connection (e.g., via transceivers). In an embodiment, the control system 40 may control various aspects of the ride system 12, such as the position, the speed (e.g., velocity), the acceleration of the ride vehicle 20 along the ride path 14, characteristics of the imagery emitted on one or more display systems 24, physical enhancements from one or more actuators 32, and the like. For example, the seats and/or suspension, of the ride vehicle 20 may include the actuators 32 (e.g., hydraulic actuators, pneumatic actuators, linear resonant actuators (LRAs)) that may vibrate or move according to a control scheme in response to a control signal from the control system 40. In an embodiment, the ride system 12 may activate a fan to provide wind effects as well as audio and/or motion effects associated with high speed (e.g., creaking sound effects, white noise sound effects, rocking or swaying motion effects) while the ride vehicle 20 is in operation to further enhance the high speed illusion effect.

In the illustrated embodiment, the control system 40 includes a processor 44, such as the illustrated microprocessor, and a memory device 42. The control system 40 may also include one or more storage devices 46 and/or other suitable components. The processor 44 may be used to execute software, such as software for controlling the ride vehicle(s) 20 and any components associated with the ride system 12 (e.g., the display system 24, the projector 26, the actuator 32). Moreover, the processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set (RISC) processors. The memory device 42 may include a volatile memory, such as random access memory (RAM), and/or a nonvolatile memory, such as ROM. The memory device 42 may store a variety of information and may be used for various purposes. For example, the memory device 42 may store processor-executable instructions (e.g., firmware or software) for the processor 44 to execute, such as instructions for controlling components of the ride vehicle 20, the egress gate 25, and/or the projector 26. The storage device(s) 46 (e.g., nonvolatile storage) may include read-only memory (ROM), flash memory, a hard drive, or any other suitable optical, magnetic, or solid-state storage medium, or a combination thereof. The storage device(s) 46 may store data (e.g., imagery, sensor data), instructions (e.g., software or firmware for controlling the imagery projected by the projector 26 onto the display system(s) 24), and any other suitable information.

In an embodiment, the ride system 12 also includes a ride environment 50, which may include multiple and differing combinations of environments. For purposes of the present disclosure, the ride environment 50 includes the type of ride (e.g., dark ride, water coaster, roller coaster, VR experience, or any combination thereof) and/or associated characteristics (e.g., theming). For example, the ride environment 50 may include aspects of the ride system 12 that add to the overall theming and/or experience associated with the ride system 12.

In an embodiment, the ride system 12 may have a motion-based environment 52, wherein passengers 22 are transported or moved by the ride system 12. For example, the motion-based environment 52 may include a flat ride 54 (a ride that moves passengers substantially within a plane that is generally aligned with the ground, such as by spinning around a vertical axis and/or translating along a substantially flat path), a gravity ride 56 (a ride wherein gravity is responsible for all or some of the movement), and/or a vertical ride 58 (a ride that displaces passengers 22 in a vertical plane around a fixed point).

The ride system 12 may include a motionless environment 60 during some portion of the ride experience, such that the passengers 22 are not substantially transported or displaced by the ride system. For example, the motionless environment 60 may include a virtual reality (V/R) feature 62 (e.g., the passenger may sit in a seat that vibrates or remains stationary while looking through a virtual reality (V/R) viewer) and/or different kinds of simulators (e.g., imagery 64 generated on the display system 24 via the projector 26).

Furthermore, the ride environment 50 may include a mixed environment 70 that includes both aspects of the motion-based environment 52 and the motionless environment 60. For example, incorporating the pull of momentum of the passenger 22 in a motion-based environment 52 with the visual stimulation of the motionless environment 60 may enhance the overall experience for the passenger 22. Further, the generation of the imagery 64 on the display system 24 while the ride vehicle is moving or stationary incorporates aspects of the motion-based environment 52 and the motionless environment 60, which makes the generation of the imagery 64 on the display system 24 desirable.

Figure 2:
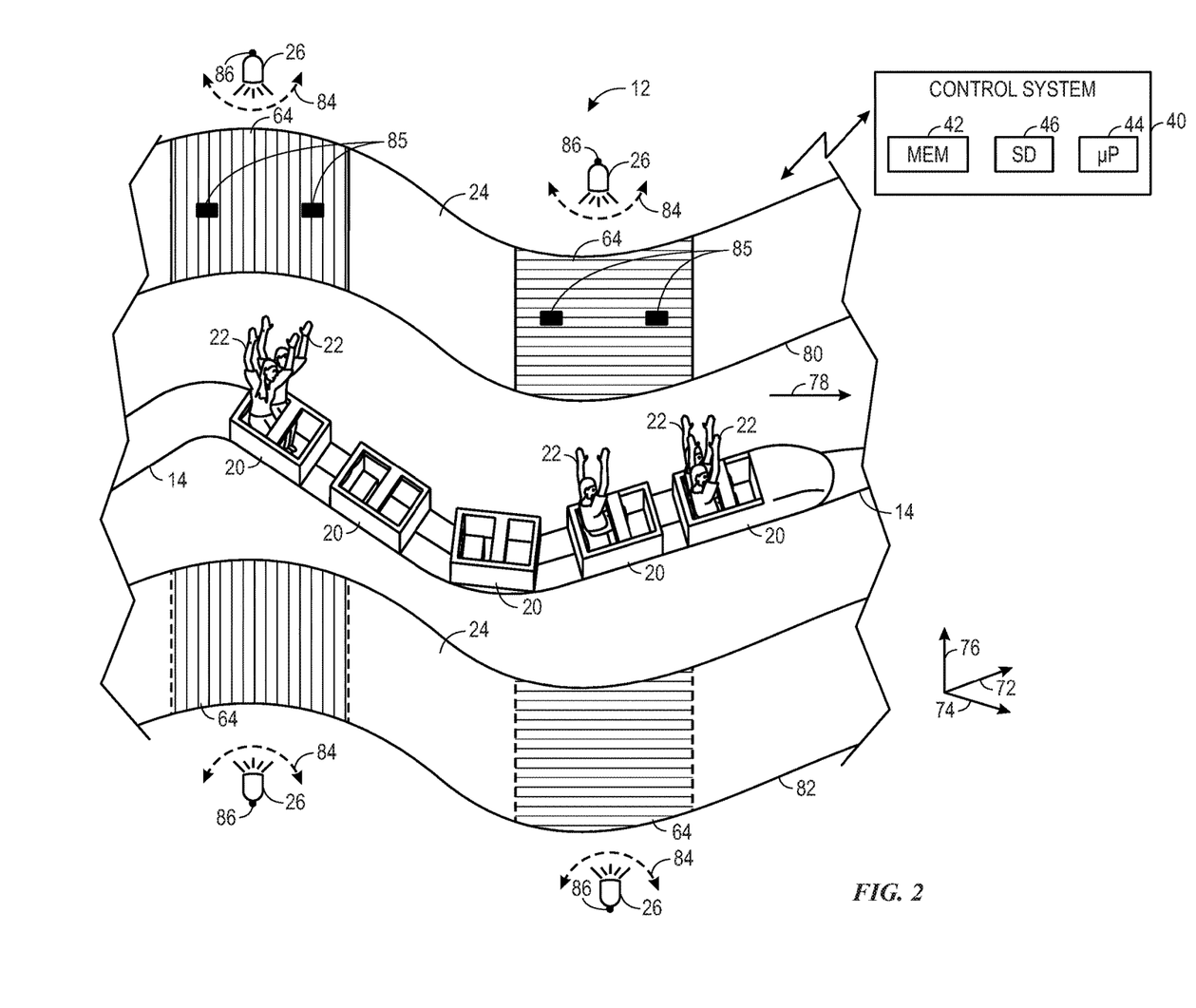
FIG. 2 depicts a side perspective view of a ride system, in accordance an embodiment of the present disclosure.

FIG. 2 depicts a side perspective view of the ride system 12 of FIG. 1, in accordance with an embodiment of the present disclosure. To facilitate discussion, the illustrated embodiment includes a coordinate system with a longitudinal axis 72, a lateral axis 74, and a vertical axis 76. The ride system 12 may include one or more ride vehicles 20 coupled together (e.g., by a linkage) and configured to drive any suitable number of passengers 22 along a direction of travel 78 (e.g., substantially parallel the longitudinal axis 72). For example, the illustrated embodiment includes five ride vehicles 20 that each accommodate two ride passengers 12. However, the ride system 12 may include any number of ride vehicles 20 configured to accommodate any number of passengers 22.

In an embodiment, the ride path 14 that the ride vehicle 20 travels along may be further defined or bounded by a first side wall 80 and a second side wall 82. The first side wall 80 is oriented laterally leftward relative to the direction of travel 78 along the ride path 14 and the second side wall 82 is oriented laterally rightward relative to the direction of travel 78 along the ride path 14, such that the side walls further define the ride path 14. Furthermore, in an embodiment, the ride system 12 may include a top surface, a floor, or any additional surfaces to further define the path 14. The above-mentioned walls and surfaces (e.g., the first side wall 80, the second side wall 82, the top surface, and the floor) may enclose the ride system and substantially block external light, such that the ride environment is dark (e.g., when the projectors 26 do not emit light). Furthermore, any of the above-mentioned walls and surfaces may serve as display systems 24 for one or more projectors 26 to generate the imagery 64 discussed in detail below. As noted above, the display systems 24 may also include displays that do not employ projectors 26 (e.g., LCD technology or any combination thereof). The generated imagery 64 may depict dynamic environmental scenery that appears to scroll past the passengers 22 at a rate dictated by the control system 40. Furthermore, the generated dynamic environment scenery may be modified to scroll past the passengers on the display system 24 as a 3-dimensional (3D) perspective view.

The image or imagery 64 may depict a plurality of repeating reference objects 85 (e.g., wall sconces, candles, bricks) whose rapid scrolling (via the display system 24) past the passengers 22 provides the illusion of high speed. For example, as the simulation effect causes the displayed repeating reference objects 85 to appear to move more rapidly in the rearward direction, the illusion of increased speed is generated. In an embodiment, the displayed reference objects 85 may include depicted light sources that briefly illuminate the ride path 14 and a portion of the display system 24 at lower vehicle speeds and that subsequently blur into pools of light as the speed simulation generates a speed simulation effect. In an embodiment, the pools of light may fade into the darkness (e.g., fade into black or dark areas) as the pools of light travel past the passengers 22. Indeed, various surfaces (e.g., floor and the walls that define or bound the ride path 14) may coordinate with one another to enhance the speed simulation. For example, the various surfaces may coordinate to create relationships/coordination between lights (imagery of light along sidewalls) and shadows (imagery of shadows along a floor panel) to enhance the speed simulation effects. In this manner, a range of simulated speeds are incorporated into the high speed simulation effect, from a starting low speed simulation to a peak simulated speed. The range of simulated speeds corresponding to the imagery 64 are aligned to take into account actual vehicle speed and/or position to enhance the effect. Further, the effect may be reversed by displaying imagery depicting the displayed reference objects 85 as blurs that resolve into recognizable objects as the illusion of high speed is reversed to simulate slowing down. Accordingly, the reference object 85 (or other portions of the imagery 64) may change in display characteristics to indicate or simulate moving away from the vehicle 20 at varying speeds. The characteristics may include one or more of color, shape, brightness, size, etc. In an embodiment, during the speed simulation effect, the reference object 85 at peak speed may be stretched out into a blur (e.g. a blur of light). This is in contrast to the reference object 85 shown at a lower speed or a speed matching the actual vehicle speed (i.e., a matched speed), in which the reference object 85 may appear as a recognizable object In an embodiment, the projectors 26 are substantially fixed relative to the display system 24, and the displayed change in imagery direction and speed is a function of the imagery data displayed by the one or more projectors 26. That is, the imagery 64 sent to the projector 26 are reflective of the desired speed of the simulation at a given time. If the control system 40 determines that the ride vehicle 20 is at peak simulated speed, the imagery 64 may be reflective of blurs of the environmental scenery. A slower speed is reflected in imagery data representing relatively more resolvable displayed reference objects 85. The speed simulation effect may cause the imagery 64 to vary between a simulated speed at peak speed and a simulated speed at rest or matched to the vehicle speed.

In an embodiment, the projectors 26 may be pivotally positioned, such that the projectors 26 may pivot to change the direction and speed at which the imagery 64 (e.g., generated by the projector 26) are displayed on the display system 24. For example, the projector 26 may be positioned behind the side walls 80, 82 and configured to rotate in a direction 84 about a pivot joint 86 at any suitable speed to modify the speed at which the imagery 64 moves (e.g., translates) along the display system 24 relative to the ride vehicle(s) 20. The speed at which the imagery 64 moves (e.g., translates) along the display system 24 relative to the ride vehicle(s) 20 may be based on a control signal (e.g., feedback data) from the control system 40 to the projector(s) 26 to cause the pivoting. Indeed, in an embodiment, the imagery may maintain structure while the projector(s) pivot. Thus, an observer may focus on an individual image (e.g., an image of a candle and an illuminated region surrounding the candle) as it passes, and it will not be blurred if the observer turns to watch the image pass. In another embodiment, imagery may be intentionally blurred to simulate speed.

While the illustrated embodiment shows separate projectors 26 projecting separate imagery 64 along the display system 24, it should be understood that the first side wall 80 and/or the second side wall 82 may receive imagery from a single projector 26. Further, imagery 64 on the first side wall 80, the second side wall 82, and any other display system 24, if projected by separate projectors 26, may be coordinated via the control system 40 such that the movement appears to occur at the same rate all around the ride vehicle 20. In addition, while the depicted embodiment shows imagery 64 separated by empty areas of the display system 24, it should be understood that the display system 24 may also display a generally continuous imagery 64 along at least a portion of the ride path 14. Furthermore, while embodiments of the present disclosure have been discussed in the context of projected imagery, it should be understood that the display system 24 as provided herein may alternatively or additionally include integrated display technology (e.g., LCD) that generates the imagery discussed herein. Such embodiments may not include the projector 26. It should be understood that reference to projected imagery may include imagery displayed in such integrated displays.

Figure 3:
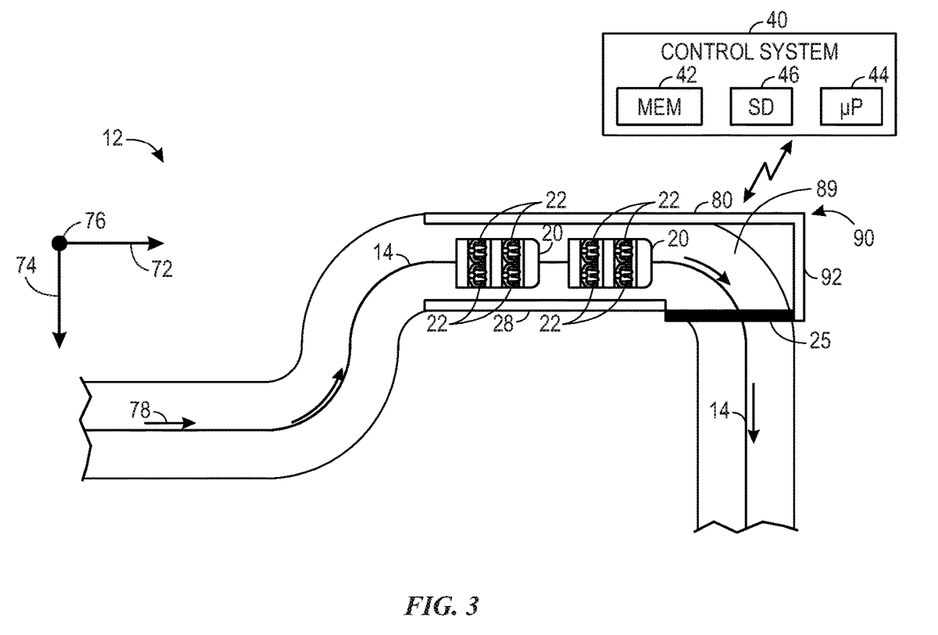
FIG. 3 depicts a top view of an embodiment of the ride system of FIG. 2, in accordance an embodiment of the present disclosure.
Figure 4:
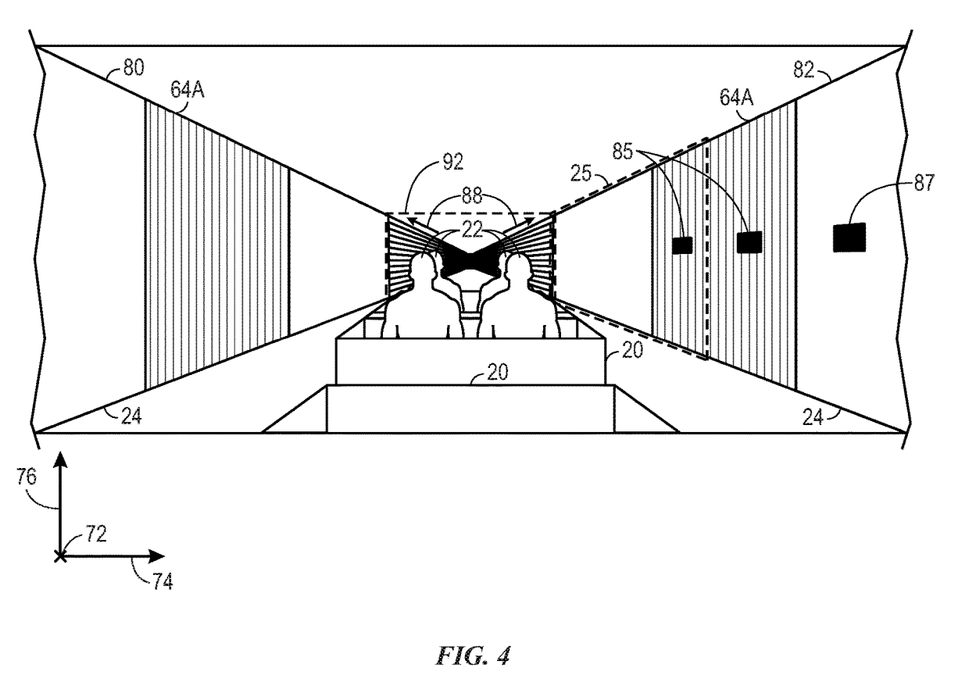
FIG. 4 depicts a corresponding perspective view of the embodiment of FIG. 3, in accordance an embodiment of the present disclosure.

FIG. 3 depicts a top view and FIG. 4 depicts a corresponding perspective view of the ride vehicle 20 of the ride system 12 of FIG. 2. As shown in FIG. 3, the speed illusion effect may be implemented in an area of the ride path 14 that may be space-constrained, for example, at an enclosure 90 (e.g., a tunnel) or a sharp bend that involves a reduction in speed of the vehicle 20. To prevent a loss of excitement for the passengers 22 associated with slowing down, the ride system 12 may incorporate a speed illusion effect during vehicle deceleration and stopping. Before the speed simulation effect commences, from the perspective of the passenger 22, the scenery 87 moves past the passenger 22 at the speed at which the ride vehicle 20 is moving when the ride vehicle 20 is in motion. The scenery 87 may be actual real-world objects, displayed imagery 64, or a combination thereof. In an embodiment, the scenery 87 may include patches of light displayed on the enclosure 90 (e.g., front wall and/or side walls) defining the ride path 14. In particular, each patch of light may be spaced apart from a subsequent patch of light at any pre-determined distance. Furthermore, the scenery 87 may be each be positioned along the first side wall 80 and the second side wall 82 at any suitable height relative to the ground.

As the ride vehicle 20 slows and the speed simulation effect commences, the imagery 64A projected on the display system 24 may be modified to take into account the speed and position of the ride vehicle 20. That is, in an embodiment, when the ride vehicle 20 reaches a certain positon along the ride path 14, the control system 40 may transmit or instruct the projector 26 to display the imagery 64 (e.g., still imagery or video transmitted by the control system 40 based on the speed and/or position inputs), showing displayed reference objects 85 moving at various speeds to compensate for the change in speed of the ride vehicle 20 (e.g., the ride vehicle slowing down). As such, the passenger 22 may experience the illusion that the ride vehicle 20 has not stopped or slowed down.

In an embodiment, the ride vehicle 20 may decelerate to a stop as it approaches a stopping position along the ride path 14. The control system 40 may receive an indication (e.g., via a sensor 30) that the ride vehicle 20 has approached the stopping position (or a speed of zero miles per hour) on the ride path. In an embodiment, when the ride vehicle 20 is at a stop (e.g., has a speed of zero miles per hour), the ride vehicle 20 may be enclosed by enclosure 90. The enclosure 90 may include the first side wall 80, the second side wall 82, a forward wall 92, and any other suitable walls (e.g., the ceiling surface and the floor). The enclosure 90 may limit an amount of external light entering the ride system 12, thereby making the environment dark. Indeed, in an embodiment, the light emitted by the projector 26 may provide the majority of the illumination in the ride system 12.

In an embodiment, the forward wall 92 shown in FIG. 4 may include the display system 24. As such, the forward wall may also receive the first imagery 64A to facilitate the illusion that the ride vehicle 20 has not stopped traveling, when it indeed slows to a stop. The forward wall 92 may project the first imagery 64A. The forward wall 92 may abut the side walls 80, 82, such that the first imagery 64A on the forward wall 92 is coordinated with the first imagery 64A on the side walls 80, 82. Accordingly, the enclosure 90 may coordinate various display systems 24 (e.g., on the side walls 80, 82 and on the front wall 92) to facilitate the generation of the illusion that the ride vehicle remains in motion. In an embodiment, the imagery 64A provides a false or simulated opening on the forward wall 94. Accordingly, portions of the display system 24 may receive different imagery 64. While the illustrated embodiment shows the front wall 92 adjacent the ride path 14 and engaging the gate 25 during operation, in some embodiments, the front wall 92 may be disposed at the end of a hall that includes, for example, imagery of a faux ride path 14 to increase the illusion of depth.

Furthermore, in an embodiment, the enclosure 90 includes the egress gate 25. The egress gate 25 may be positioned proximate the second side wall 82 to further define the second side wall 82. Accordingly, the egress gate 25 may be positioned laterally rightward relative to the direction of travel 78 of the ride vehicle 20. In an embodiment, the egress gate 25 may block the ride path 14. For example, the ride path 14 may be defined by a turn (e.g., a 90 degree turn) such that the egress gate 25 blocks the portion of the path defined by the turn when the egress gate 25 is in the closed position. In an embodiment, the egress gate 25 serves as one of the display systems 24 when the egress gate 25 is in the closed position. That is, when the egress gate 25 is in the closed position, the egress gate 25 may receive the first imagery 64A from the projector 26 to enable the generation of the illusion that, for example, lights travel past the passenger 22 as a result of the ride vehicle 20 remaining in motion at the target speed (e.g., 15 mph).

It should be noted that any of the components of the ride system 12 may be communicatively coupled to the control system 40. For example, the egress gate 25, the ride vehicle 20, the actuators 32, the projector 26, and the like, may all be communicatively coupled to the control system 40. In an embodiment, the control system 40 may receive sensor data indicative of the performance of the ride system 12. For example, the control system 40 may receive sensor data indicative of the speed (e.g., in miles per hour) and/or position of the ride vehicle 20, the characteristics of light associated with the first imagery 64A projected by the projector 26, the position of the egress gate 25 (e.g., open or closed), and the like. The control system 40 may process the sensor data and execute instructions to control the position (and speed) of the ride vehicle 20, the position (and speed) of the egress gate 25, and the position (speed) and light characteristics of the projector 26, thereby creating the first imagery 64A. Indeed, in an embodiment, the position (speed) or the light characteristics of the projector 26 may change in response to the egress gate 25 changing positions (e.g., opening). Furthermore, it should be understood that the vehicle speed and/or the imagery speed may be adjusted in response to the change in position of the egress gate 25 (e.g., opening) to achieve desired speed effects, which may provide a sense of executing a turn at a target speed to the passengers 22.

While in the illustrated embodiment, the above-mentioned components of the ride system 12 are communicatively coupled to the control system 40, the above-mentioned components (e.g., the egress gate 25, the ride vehicle 20, the actuators 32, and the projector 26) of the ride system 12 may be coupled to different respective control systems. In addition, the respective control systems may be communicatively coupled to a remote (e.g., base station) control system that may coordinate the control of the above-mentioned components of the ride system 12. Furthermore, it should be noted that the control via the control system 40 is not limited to these components and their corresponding control parameters.

Figure 5:
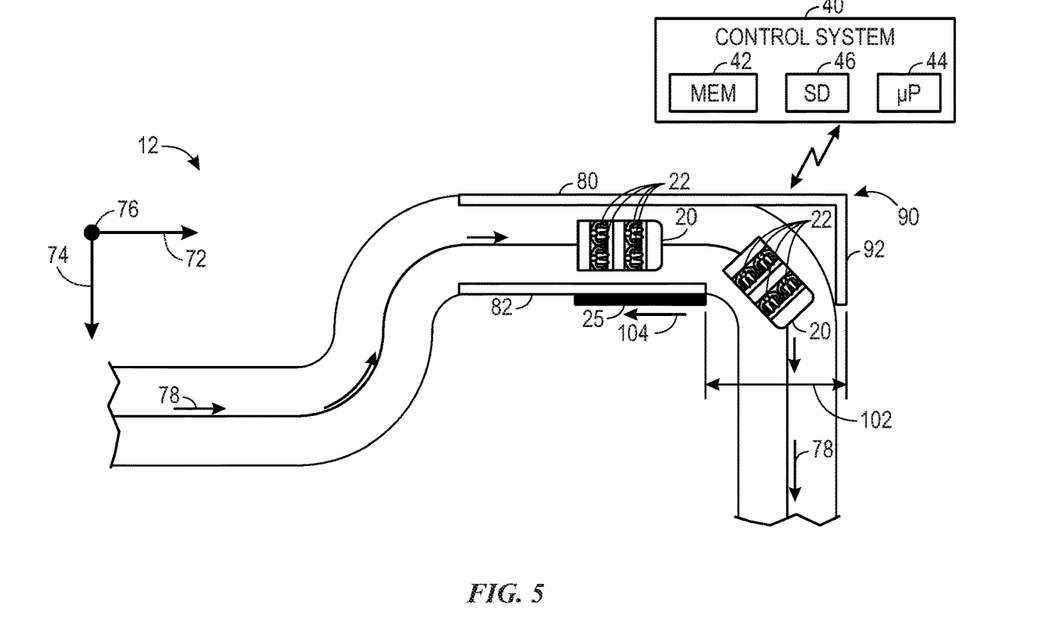
FIG. 5 depicts a top view of an embodiment of the ride system of FIG. 2, in accordance an embodiment of the present disclosure.
Figure 6:
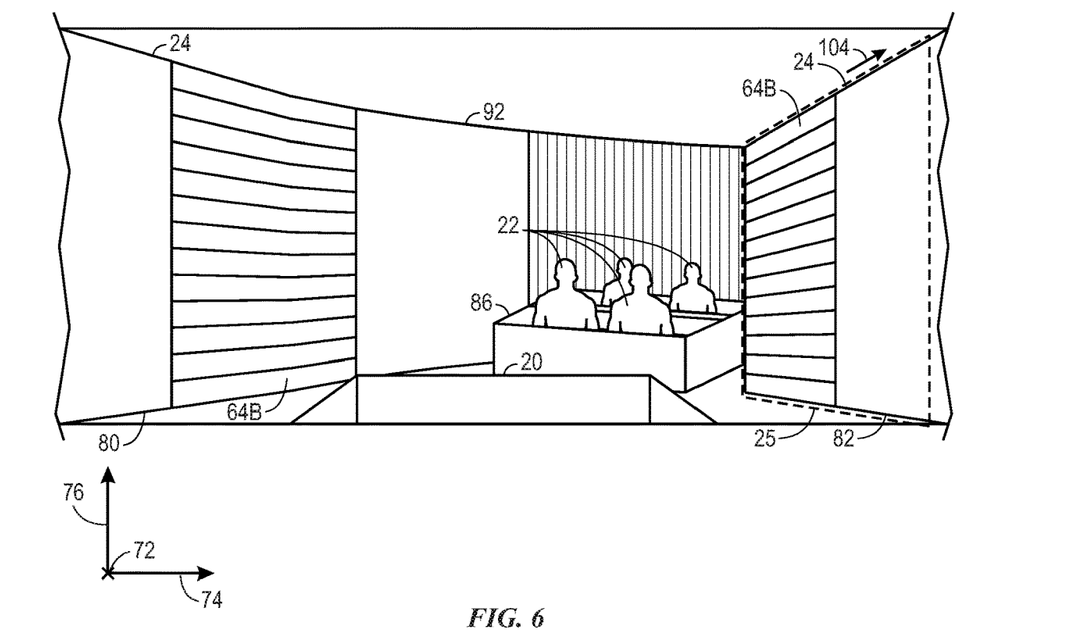
FIG. 6 depicts a corresponding perspective view of the embodiment of FIG. 4, in accordance an embodiment of the present disclosure.

FIG. 5 depicts a top view and FIG. 6 depicts a corresponding perspective view of the ride vehicle 20, whereby the display system 24 generates a second imagery 64B to enhance the turning motion of the ride vehicle 20, in accordance with an embodiment of the present disclosure. The second imagery 64B may enhance the transition of the ride vehicle 20 from being stationary to accelerating and continuing along the ride path 14. Moreover, the second imagery 64B may facilitate the transition of the ride vehicle 20 from being in the stationary position to turning along the ride path 14 through the path defined by opening 102 formed by the opening of egress gate 25.

In the illustrated embodiment, the egress gate 25 is configured to slide along direction 104 until open. For example, the egress gate 25 may slide behind the second side wall 82 when the egress gate 25 translates along direction 104 to an open position. The translation of the egress gate 25 may be enabled by any suitable system and method, such as a linear actuator driving linear motion on bearings. However, it should be noted that in an embodiment, the egress gate 25 may open via any other suitable method, such as by rotating (e.g., about a hinge), translating downwardly, and the like.

In an embodiment, the second imagery 64B may result in response to a control signal that causes the light emitted from the projector 26 to change from generating the first imagery 64A to generating the second imagery 64B, thereby changing the imagery 64 on the display system 24. For example, the control signal may be an identification that the first imagery 64A has ended (e.g., after time duration T0 has expired). In such case, after the control system 40 has identified that the ride vehicle 20 has remained stationary (e.g., after determining that time T0 has expired) and that the display system 24 has received the first imagery 64A, the control system 40 may start the second imagery 64B. Accordingly, in an embodiment, the generation of the first imagery 64A, the generation of the second imagery 64B, and/or the opening of the egress gate 25 may be coordinated with a timestamp.

When the control system 40 starts displaying the second imagery 64B, the projector 26 projects the lights on the display systems 24 (e.g., on the side walls 80, 82 and/or the egress gate 25) such that it appears from the perspective of the passenger 22 as if the ride vehicle 20 is traveling at a suitable speed and executing a turn. This illusion may be created by the control system 40 causing the projector 26 to project lights on the display system 24, such that the lights travel past the passenger 22 along the display system 24 at a speed that compensates for the ride vehicle starting from rest. That is, the second imagery 64B may generate a display of light (e.g., via the projector 26), as if the lights are traveling past the ride vehicle 20 while the ride vehicle is executing the turn. Since the environment may be dark, the ride passenger may not notice that the egress gate 25 is transitioning from the closed position to the open position. In an embodiment, the second imagery 64 may include emitting light on the egress gate 25 (e.g., the display system 24) while the egress gate 25 is opening and the ride vehicle 20 is executing a turn. When the egress gate 25 is open, it may enable the ride vehicle 20 to travel along the ride path 14 via the opening 102.

In an embodiments, while the ride vehicle is executing the turn, the projector may stop displaying the first imagery 64A on the front wall 92. Accordingly, the front wall 92 may not display any imagery 64 (e.g., emitted light or video) from the projector 26, while the second imagery 64B is being displayed on the display systems, such as the egress gate 25 and the side walls 80, 82.

Furthermore, the second imagery 64B may be displayed at any suitable time after the egress gate 25 has started to open, thereby creating the illusion that the ride vehicle 20 is driving into a turn, instead of driving into the opening 102 created by opening the egress gate 25. This illusion may be created by coordinating the display of the second imagery 64B, the opening of the egress gate 25, and the driving of the ride vehicle 20. The illusion created by the second imagery 64B may create the effect that the ride vehicle 20 was being driven for the duration of time the passenger 22 was in the ride vehicle 20. In an embodiment, the display of the second imagery 64B may terminate after the ride vehicle 20 has executed the turn into the opening 102. Alternatively, the display of the second imagery 64B may terminate after the egress gate 25 is completely open.

Figure 7:
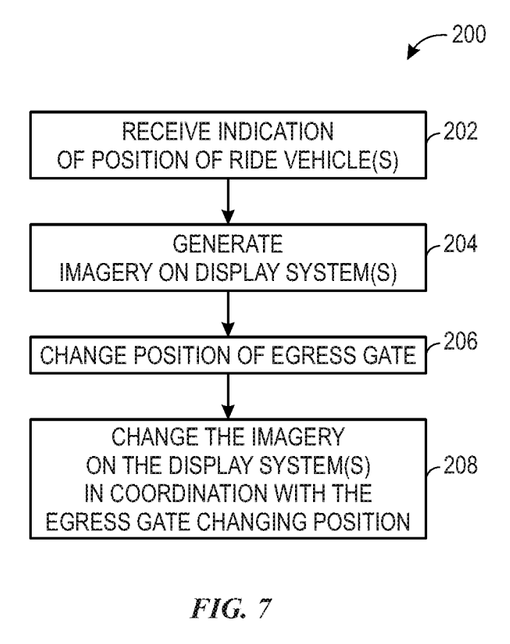
FIG. 7 depicts a flow diagram of a process whereby imagery on a display system changes in coordination with an egress gate changing position, in accordance an embodiment of the present disclosure.

FIG. 7 depicts a flow diagram of a process 200 whereby the imagery 64 (FIGS. 1-4) on the display system 24 (FIGS. 1-4) changes in coordination with the egress gate 25 (FIG. 3-4) changing position (e.g., from closed to open). In an embodiment, the control system 40 (FIGS. 1-4) receives (process block 202) an indication of a position associated with the ride vehicle(s) 20 (FIGS. 1-4). After receiving the indication (e.g., of the position of the ride vehicle(s) 20), the control system 40 generates (process block 204) imagery 64 on a display system(s) 24 (FIGS. 1-4). Furthermore, the control system 40 may change (process block 206) the position of the egress gate 25 (FIGS. 3-4) from the closed position to the open position to allow the ride vehicle 20 to continue along the ride path 14 (FIG. 1-4). The control system 40 is configured to change (process block 208) the imagery 64 on the display system(s) 24 based on the egress gate 25 changing position.

In an embodiment, the control system 40 is communicatively coupled to the ride vehicle 20 and the sensors 30 (FIG. 1) associated with the ride vehicle 20. The sensors 30 may detect information, as sensor data, associated with the ride vehicle 20. In an embodiment, the control system may receive (process block 202) the sensor data to determine the position (speed, acceleration, time of operation, or any other suitable parameters) of the ride vehicle 20. Furthermore, the control system 40 may maintain a time log of the ride system 12, such that the control system 40 may execute, via the processor 44 (FIG. 1-4), certain instruction stored in the memory device 42 (FIG. 1-4) at a certain time. For example, the control system 40 may generate (process block 204) imagery 64 on the display system(s) 64 in coordination with the control system 40 determining that the ride system 12 is operating at a certain time.

In an embodiment, the control system 40 generates (process block 204) the imagery 64 on the display system(s) 24 in coordination with determining that the ride vehicle 20 is at a certain position (speed) along the ride path 14. That is, the control system 40 may generate the imagery 64 after receiving the certain indication (e.g., sensor data) of the position or speed of the ride vehicle 20. The certain indication may be sensor data identifying that the ride vehicle 20 has come to a stop (e.g., and has a speed of zero miles/hour). Alternatively or in addition, the control system 40 may begin generating the imagery 64 (e.g., the first imagery 64A) on the display system 24 after time, T1, from the start time of the ride system 12. In an embodiment, generating the imagery 64 may include the control system 40 actuating the projector 26 (FIG. 1-4) to produce the first imagery 64A on the egress gate 25 (e.g., the display system 24), as described in detail above.

In an embodiment, after the control system causes the projector 26 to produce the first imagery 64A, the control system 40 changes (process block 206) the position of the egress gate 25. In an embodiment, the position of the egress gate 25 may change after the first imagery 64A has been generated for a time duration equal to time, T0. As mentioned above, the egress gate 25 may be positioned laterally rightward relative to the direction of travel 78 of the ride vehicle 20. Furthermore, the egress gate 25 may block the ride path 14 when the egress gate 25 is closed. For example, the ride path 14 may be defined by a turn (e.g., a 90 degree turn) such that the egress gate 25 blocks the portion of the path defined by the turn when the egress gate 25 is in the closed position. As a result of the egress gate 25 changing from the closed position to the open position, the ride path 14 may be unblocked.

In an embodiment, the imagery 64 on the display system 24 change in coordination with the egress gate 25 changing positions (e.g., from the closed position to the open position). For example, as described in detail above, the control system 40 may cause the projector 26 to display the second imagery 64B after displaying the first imagery 64A. The second imagery 64B may include the projector 26 projecting the lights on the display systems 24 such that it appears from the perspective of the passenger 22 as if the ride vehicle 20 is traveling at a lower speed and executing the turn defining the ride path. This illusion may be created by the control system 40 causing the projector 26 to project lights on the display system 24, such that the lights travel past the passenger along the display system 24. That is, the second imagery 64B may generate a display of light (e.g., via the projector 26), as if the lights are traveling past the ride vehicle 20 while the ride vehicle 20 is executing a turn. In an embodiment, the transition from the first imagery 64A to the second imagery 64B may also include the display system 24 of the egress gate 25. In an embodiment, the imagery 64 projected on the egress gate 25 are adjusted to mask the opening motion such that the passengers 25 view a combination projected imagery and actual imagery that are synchronized during opening of the egress gate 25. At the conclusion of the presentation of the second imagery 64B, after the egress gate 25 has changed position, and after the control system 40 drives the ride vehicle 20 to execute the turn, the ride vehicle 20 may continue along the ride path 14, traveling past lights projected on walls via the projector 26.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride system comprising:
a ride vehicle configured to move along a ride path at a first speed in a forward direction;
a display system proximate the ride path, wherein the display system is external to the ride vehicle, wherein the display system is configured to display imagery of an object moving at a second speed and away from the forward direction, wherein the second speed is based on a position of the ride vehicle, the first speed of the ride vehicle, or a combination thereof; and
a control system comprising a processor and a memory device communicatively coupled to the processor and configured to store instructions to cause the processor to:
provide a first control signal to cause the display system to change the display of the imagery from the second speed of the imagery to a third speed, wherein the third speed is higher than the second speed, based on the ride vehicle decelerating from the first speed.

2. The ride system of claim 1, wherein the ride system comprises an egress gate configured to assume an open position or a closed position along the ride path, wherein the closed position is configured to block progress of the ride vehicle along the ride path.

3. The ride system of claim 2, wherein the instructions cause the processor to provide a second control signal to cause the egress gate to transition from the closed position to the open position.

4. The ride system of claim 3, wherein the instructions cause the processor to provide the second control signal subsequent to receiving an input that the ride vehicle is stopped.

5. The ride system of claim 2, wherein the egress gate is configured to assume the open position or the closed position by translating along a longitudinal axis that intersects a direction of travel for the ride vehicle.

6. The ride system of claim 2, wherein the egress gate comprises at least a portion of the display system.

7. The ride system of claim 1, wherein the instructions to provide the first control signal are further based on a time stamp associated with a duration of the ride system.

8. The ride system of claim 1, comprising an additional display system positioned on one or more of a first side wall, a second side wall, a ceiling surface, a floor, a front wall, or some combination thereof, wherein the first side wall, the second side wall, the ceiling surface, the floor, and the front wall form a portion of an enclosure configured to enclose the ride vehicle and the ride path, and wherein the displayed imagery is projected onto the display system and the additional display system.

9. The ride system of claim 1, wherein the control system is configured to provide a second control signal to cause the ride vehicle to decelerate or stop along the ride path.

10. The ride system of claim 1, wherein the imagery comprises a plurality of reference objects.

11. The ride system of claim 10, wherein changing the display of the imagery from the second speed causes a first change in imagery display characteristics of the plurality of reference objects.

12. The ride system of claim 11, wherein changing the imagery display characteristics comprises a second change in resolution, shape, color, or light.

13. The ride system of claim 1, wherein the instructions cause the processor to provide the first control signal to cause the display system to change the second speed to match the first speed of the ride vehicle.

14. A vehicle ride system comprising:
a ride vehicle configured to move along a ride path in a ride environment;
a display system forming at least a portion of the ride environment, the display system being disposed external to the ride vehicle along the ride path and fixed relative to the ride path; and
a control system comprising a processor and a memory device communicatively coupled to the processor and configured to store instructions to cause the processor to:
cause the ride vehicle to move along the ride path at a first speed, wherein the ride path is adjacent to the display system; and
cause the display system to change a speed of imagery of an object moving away from the ride vehicle from a second speed to a third speed based on the ride vehicle decelerating from the first speed, wherein the third speed is higher than the second speed.

15. The vehicle ride system of claim 14, wherein the object is displayed with different display characteristics at the second speed relative to the third speed.

16. A method, comprising:
- receiving a ride vehicle traveling at a first speed into an area comprising one or more display systems external to the ride vehicle and fixed within the area;
- displaying, on the one or more display systems, a speed simulation effect comprising moving imagery, wherein displaying the speed simulation effect comprises changing a second speed of the moving imagery to a third speed based on the ride vehicle decelerating from the first speed, wherein the third speed is higher than the second speed;
- opening an egress gate after the ride vehicle decelerates, wherein the egress gate comprises a portion of the one or more display systems; and
- causing the ride vehicle to travel through the egress gate in response to the opening of the egress gate.

17. The method of claim 16, wherein the area is a tunnel and wherein the displaying of the speed simulation effect comprises displaying an image of the tunnel opening on the one or more display systems.

* * * * *